(12) United States Patent
Tsumura

(10) Patent No.: US 7,724,659 B2
(45) Date of Patent: May 25, 2010

(54) NETWORK-BASED AUTODISCOVERY SYSTEM FOR MAC FORWARDING DISPATCHER

(75) Inventor: Tadashi Tsumura, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 819 days.

(21) Appl. No.: 11/616,267

(22) Filed: Dec. 26, 2006

(65) Prior Publication Data

US 2007/0118655 A1    May 24, 2007

(30) Foreign Application Priority Data

Dec. 27, 2005    (JP)    ............... 2005-376551

(51) Int. Cl.
  *H04L 12/26*  (2006.01)
  *H04L 12/56*  (2006.01)
(52) U.S. Cl. .............. 370/230; 370/235; 370/254; 370/400; 709/226; 709/235
(58) Field of Classification Search .............. None
  See application file for complete search history.

(56) References Cited

U.S. PATENT DOCUMENTS 7,257,109 B2 *  8/2007  Sylvain  ............... 370/352
7,290,050 B1 *  10/2007 Smith et al.  ............ 709/224

FOREIGN PATENT DOCUMENTS

| JP | 2001-069173 | 3/2001 |
| JP | 2003-008662 | 1/2003 |
| JP | 2004-320186 | 11/2004 |
| JP | 2005-175755 | 6/2005 |

OTHER PUBLICATIONS

H. Kashima, "Network-based Problem Determination for Distributed Computer Systems," ICDE 2005, pp. 1-12.
Kotaro Shinohara, "Special Feature 1. Let's make a server which is resistant to a crisis. A server which does not allow an illegal invasion; Basic knowledge of Firewall" net. PC, ASCII Corporation, Mar. 1, 1998, vol. 3, No. 3, pp. 44-51.

* cited by examiner

*Primary Examiner*—Melanie Jagannathan
(74) *Attorney, Agent, or Firm*—Ido Tuchman; Shimokaji & Associates, P.C.

(57) ABSTRACT

A method, apparatus, and computer program product for detecting a connection configuration of a network system. An embodiment includes acquiring first and second network data flowing in the network system; determining whether the contents of the first network data are identical with those of the second network data, and whether a destination address of the first network data is identical with a source address of the second network data; and providing output indicating that a load balancing apparatus is set to have the source address of the second network data, and that a cluster node is set to have a destination address of the second network data, in response to a determination that there is a coincidence in the above-mentioned determining step. The embodiment makes it possible to grasp a logical connection relationship of a current network, without relying on memory of a system administrator.

7 Claims, 6 Drawing Sheets

600

| 601 | 602 | 603 | 604 | 605 |
|---|---|---|---|---|
| SOURCE MAC ADDRESS | DESTINATION MAC ADDRESS | DATA HASH VALUE | REGISTERING TIME | NETWORK DATA |
| 00 11 22 33 AA BB | 00 AB 22 CCDD 33 | 123A4B6001F | 2006:1231:22:31:01.012 | 00 ··· |
| ⋮ | ⋮ | ⋮ | ⋮ | ⋮ |

US 7,724,659 B2

NETWORK-BASED AUTODISCOVERY SYSTEM FOR MAC FORWARDING DISPATCHER

CROSS-REFERENCE TO RELATED APPLICATIONS

This application claims priority under 35 U.S.C. §119 to Japanese Patent Application No. 2005-376551 filed Dec. 27, 2005, the entire text of which is specifically incorporated by reference herein.

BACKGROUND OF THE INVENTION

The present invention relates to grasping, from network data, information on connection of nodes each of which is a component of a load balancing system configured with a redundant system.

Recently, companies have been constructing many systems for their customers or internal use via the Internet or intranet in order to provide various services. In order to prevent damage due to a loss of business opportunity or suspension of business operation, these systems are generally load balancing systems, in which loads are balanced by each processing, and which are redundant. In particular, in Web systems used in mission-critical business operation, a load balancing apparatus is often used to configure a cluster for the purposes of achievement of high availability and high speed.

In the field of system management or business management, system configuration information is used for analysis of impact of each system component upon a whole system or business. Although a system administrator should grasp the system configuration information, it is difficult to grasp the system configuration information with accuracy and in real time in some cases: where, as time goes by, the system administrator is changed, or the system administrator often comes to have a dim memory of the system configuration information; and where there are many system administrators, when a single company operates many systems for business or customers.

Some of the load balancing systems adopt a MAC (Media Access Control) transfer mode, which involves using a virtual IP (Internet Protocol) address and a MAC address for transfer via a load balancing server, in order that users can unconsciously access the systems.

The load balancing system based on the MAC transfer mode is configured of a load balancing server and one or more cluster nodes, which are installed in the same segment. The load balancing server receives a packet destined for a virtual IP address for use in a cluster, rewrites only Ethernet layer information, and forwards the packet to an Ethernet address (or a MAC address) of a cluster node by use of uniquely set ARP (Address Resolution Protocol table) information. On the other hand, the cluster node is set to receive the packet destined for the virtual IP address. The cluster node recognizes that the packet is received directly from a client, and sends back the packet directly to the client, without passing through the load balancing server.

As a result of automatic detection of the load balancing system based on the MAC transfer mode, however, the load balancing system is recognized as one node having a virtual IP address, whereby it is made impossible to grasp the overall configuration of the load balancing system. In other words, network analysis of IP or higher layers leads to a recognition that packets with the identical contents are overlapping. Even if MAC address information in the packet is used for analysis, it is necessary to analyze by use of knowledge of a correspondence between, in a monitor segment, a physical network structure (a relationship between MAC and IP addresses) and a logical network structure. For example, when two transactions having the identical contents but different MAC addresses are observed, it is required to determine whether this overlap is caused by MAC transfer, or packets on different channels are monitored in an overlapping manner. Additionally, there may be a case of merely retransmitting between communication devices, and thereby it is difficult to determine.

H. Kashima discloses a method for grasping a calling relationship by using transaction information in "Network-based Problem Determination for Distributed Computer Systems," ICDE 2005. The method disclosed in non-patent document 1 finds the calling relationship, provided that there is a transaction having IP or higher layer information. The method is incapable of finding the system configuration formed of the load balancing system. The method is aimed at solely analysis by using the found configuration information.

In a load balancing system, in order to grasp an overall redundant system for impact analysis, it is needed to acquire information on a connection relationship of load balancing servers and cluster nodes based on the MAC transfer mode.

BRIEF SUMMARY OF THE INVENTION

In order to solve the foregoing problems, the present invention provides an apparatus for detecting a connection configuration of a network system including plural network devices. The apparatus includes: means for acquiring first and second network data flowing in the network system; means for determining whether the contents of the first network data are identical with those of the second network data, and whether a destination address of the first network data is identical with a source address of the second network data; and means for providing output indicating that a load balancing apparatus is set to have the source address of the second network data, and that a cluster node is set to have a destination address of the second network data, in response to a determination that there is a coincidence in the above-mentioned determining step. The apparatus makes it possible to grasp a logical connection relationship of a current network, without relying on memory of a system administrator.

BRIEF DESCRIPTION OF THE SEVERAL VIEWS OF THE DRAWINGS

FIGS. 8A and 8B show examples of network components found by the load balancing system detecting apparatus.

DETAILED DESCRIPTION OF THE INVENTION

In the following, a description will be provided of the present invention through an embodiment of the present invention. However, the following embodiments do not restrict the invention in the scope of the invention and all combinations of features explained in the embodiment are not always essential to means of the invention for solving the problems.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Figure 1:
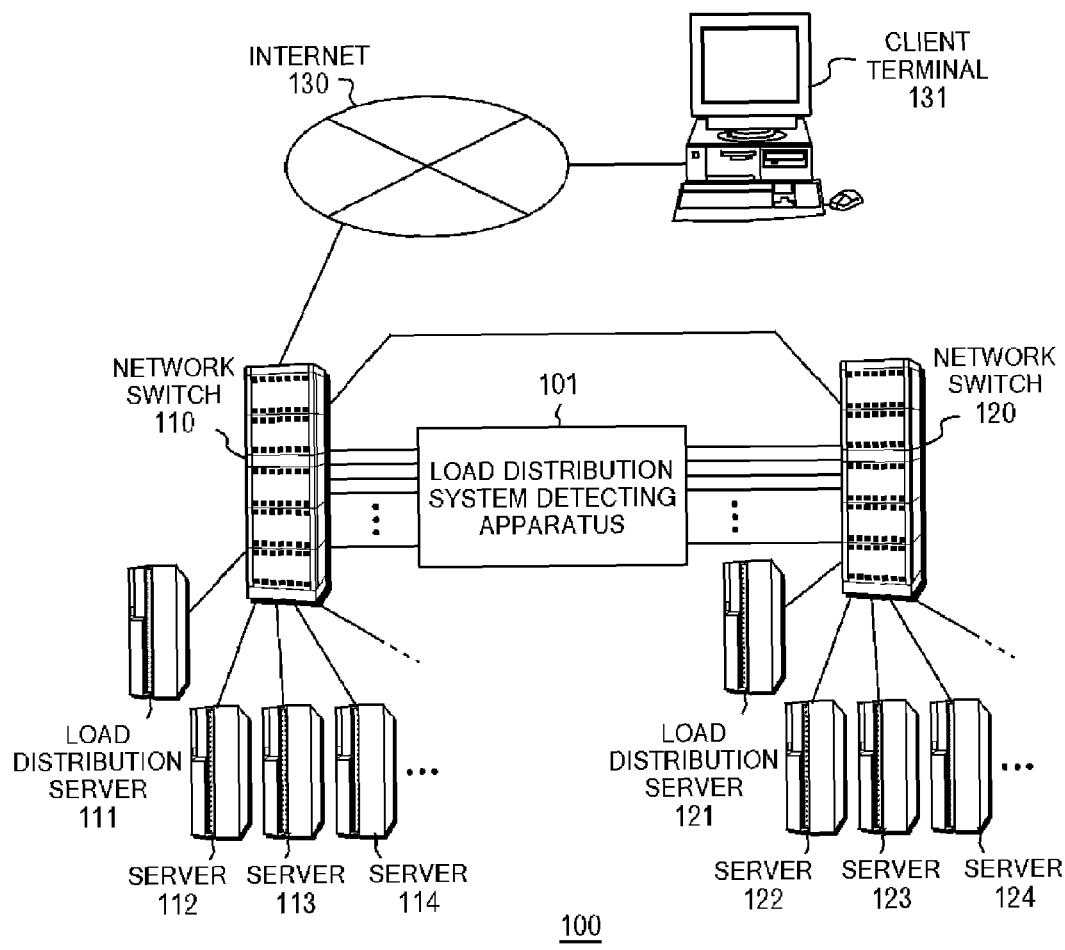
FIG. 1 shows an example of an environment of a network where a load balancing system detecting apparatus operates.

FIG. 1 shows an example of an environment 100 of a network system in which plural network devices, and in which a load balancing system detecting apparatus operates. Although a network, as employed herein, is assumed to be configured of two network switches 110 and 120, the network may be configured of one switch, or a load balancing system detecting apparatus 101 can support a network with three or more network switches. The load balancing system detecting apparatus 101 is connected to the network switches. By use of a mirroring function of the network switches, the load balancing system detecting apparatus 101 can acquire network data such as packets transmitted between the network switches 110 and 120, and server devices 111 to 114 or 121 to 124.

Besides this, acquisition of network data may be configured to acquire the network data by directly monitoring network lines. The network switch 110 has connections to the load balancing server (balancing processing unit) 111, the processing servers 112 to 114 and the like. Herein, the load balancing server 111 serves to transfer, to processing servers, network data forwarded to a virtual IP address. Likewise, the network switch 120 has connections to the load balancing server (balancing processing unit) 121, the processing servers 122 to 124 and the like. The network switches 110 and 120 are connected directly or indirectly to each other. The network system may be connected to a client terminal 131 via a network such as the Internet 130.

Figure 2:
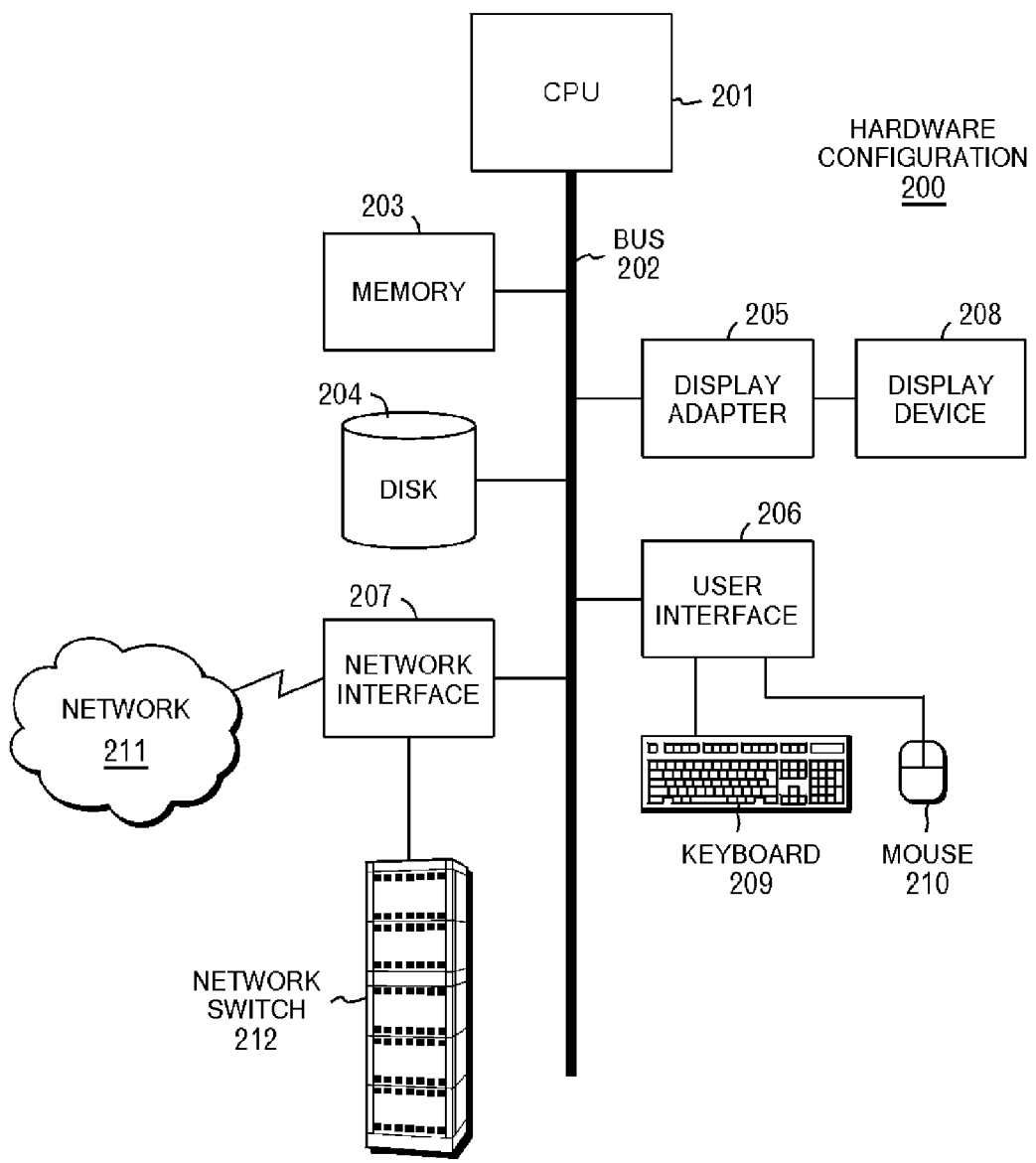
FIG. 2 is a schematic diagram of a hardware configuration in which the load balancing system detecting apparatus operates.

FIG. 2 is a schematic diagram of a hardware configuration 200 in which the load balancing system detecting apparatus operates. A CPU 201, a central processing unit, executes various programs under control of various operating systems. The CPU 201 is interconnected via a bus 202 with a memory 203, a disk 204, a display adapter 205, a user interface 206 and a network interface 207. The disk 204 contains software and an operating system which cause a computer for realizing the present invention to function, as well as programs and the like for implementing the present invention. These programs are loaded into a memory and executed by the CPU, as needed. The disk 204 also holds network data acquired from the network switches and the like, or in-process data and the like to obtain network configuration information.

The CUP 201 is connected to a keyboard 209 and a mouse 210 via the user interface 206, to a display device 208 via the display adapter 205, and to a network 211 via the network interface 207. The load balancing system detecting apparatus is operated by use of the keyboard 209 and the mouse 210, and in-process or processed data is displayed on the display device 208. The network interface 207 is connected to a network card or the like.

The present invention may be carried out in a distributed environment via the network 211. The CUP 201 is connected to a network switch 212 via the network interface 207. Incidentally, the hardware configuration 200 is a mere example of one embodiment of a computer system, bus arrangement and network interconnection, and features of the present invention can be achieved in various system configurations such as a form having plural identical components or a form further distributed on the network.

Figure 3:
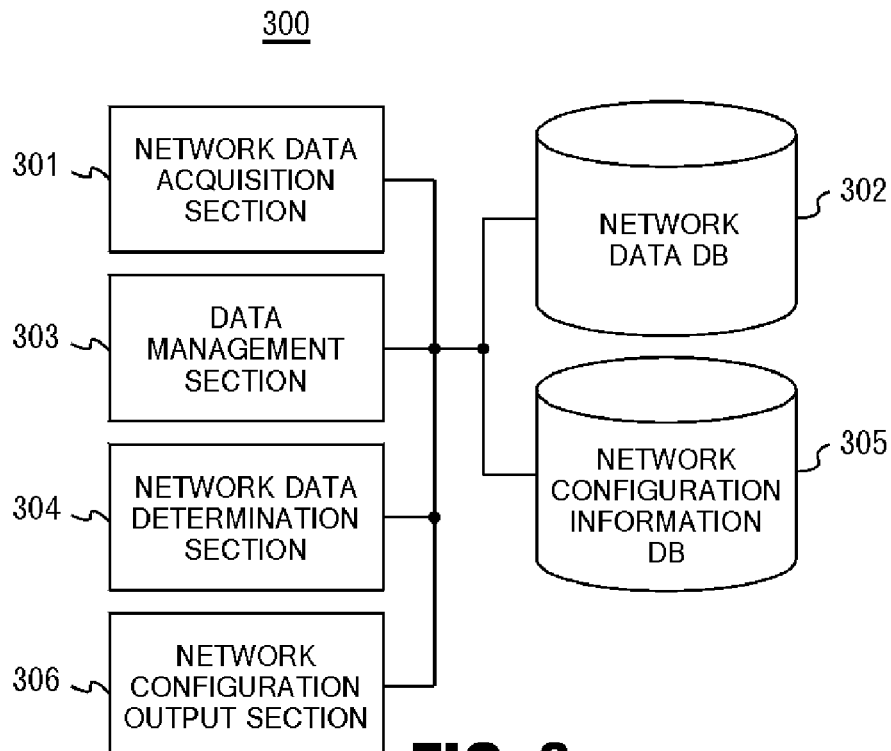
FIG. 3 is a schematic functional configuration diagram.

FIG. 3 is a schematic functional configuration diagram. A network data acquisition section uses the mirroring function of the network switches to acquire network data, and registers the network data in a network data database (DB) 302. However, when network data, which has the identical contents, except an Ethernet header, with acquired network data, has been registered, a network data acquisition section 301 does not register the network data, but passes the data for subsequent processing to a network data determination section.

A data management section 303 abandons network data registered in the network data database 302, under time-out control, and thereby manage the network data. While, an enormous amount of network data flows in the network, network data transfer based on a MAC transfer mode takes place in a mere instant. Accordingly, it is made possible to find overlapping network data without holding network data for a long time. Thus, the data management section 303 deletes the network data after a certain period of time. The deletion of network data may be performed in response to a flag representing a completion of a transaction containing the network data. When network data with the identical contents, except the Ethernet header, has been already registered, a network data determination section 304 specifies a source MAC address from the Ethernet header, and determines the load balancing server and the cluster node from the contents of a destination MAC address. Details of processing will be described later. A network configuration output section 306 associates the load balancing server with the cluster node for each cluster, and outputs resultant data.

Figure 4:
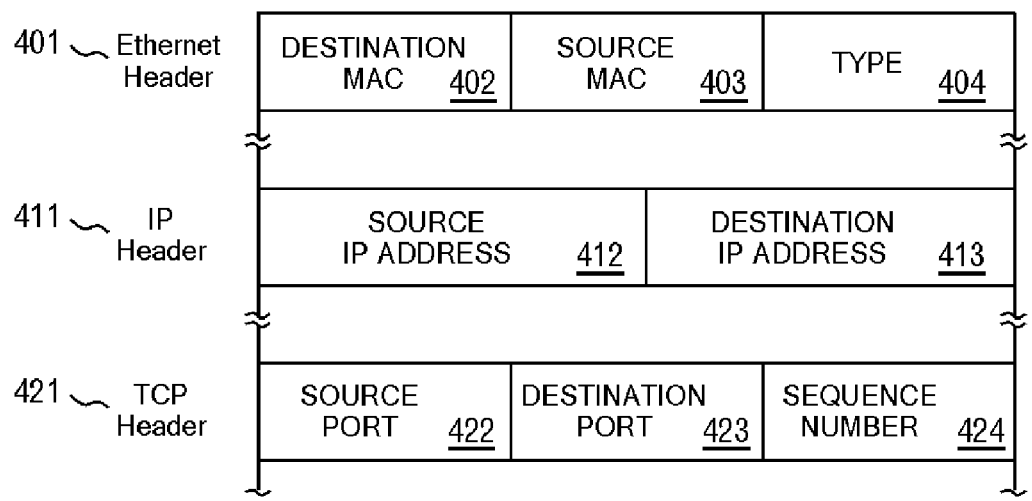
FIG. 4 shows an example of network data (a packet).

FIG. 4 shows an example of network data (a packet). Reference numeral 401 denotes the Ethernet header. The Ethernet header 401 contains a destination MAC address 402, a source MAC address 403, a type 404, and the like. An IP header 411 contains a source IP address 412 and a destination IP address 413. A TCP (Transmission Control Protocol) header 421 contains a source port 422, a destination port 423 and a sequence number 424. When the load balancing server transfers network data, which are destined for a virtual IP address, to the cluster node by the MAC transfer mode, two network data with the precisely identical contents except the Ethernet header come to exist. Specifically, in one of the two network data, the destination MAC address is the load balancing server. Since this data is transferred by the load balancing server, in the other network data, the destination MAC address is to be the cluster node, and the source MAC address is to be the load balancing server.

FIG. 5A shows a simple example 500 for explaining changes in the MAC and IP addresses, when network data from a client terminal is transferred by the load balancing server using the MAC transfer mode and reaches the cluster node. A client terminal 501 has an IP address named IP_C1. A network switch 502 has MAC addresses named MAC_S1 and MAC_D1, respectively. Reference numeral 503 denotes a cluster of computers including a load balancing server. The cluster 503 is assigned a virtual IP address IP_V. The cluster 503 includes a load balancing server 504 and a cluster node 505. The load balancing server 504 is assigned an IP address named IP_D and a MAC address named MAC_D.

The cluster node 505 is assigned an IP address named IP_N1 and a MAC address named MAC_N1. A network switch 506 has a MAC address MAC_S2. The network switch 506 has a connection to a server 507, which is assigned an IP address named IP_O and a MAC address named MAC_O. The server 507 is the server of the following stage, such as a database, which is managed in a different segment in order to enhance security. The network data (the packet) originating from the client terminal 501 flows along through paths 1 to 4 in the configuration of the example 500.

FIG. 5B shows how the IP and MAC addresses of network data change. The IP address in the network data path 1 is identical with that in the path 2, but the destination MAC address in the path 1 is identical with the source MAC address in the path 2. This indicates that the load balancing server 504 performs the MAC transfer of the network data. The network data in the path 1 is identical with that in the path 2, exclusive of the Ethernet header. Comparison of the network data in the paths 3 and 4 shows that the source and destination MAC addresses thereof do not coincide with each other at all. This indicates that the network data is transferred via the network switch. Likewise, the network data in the path 3 is identical with that in the path 4, exclusive of the Ethernet header.

Figures 6, 8:
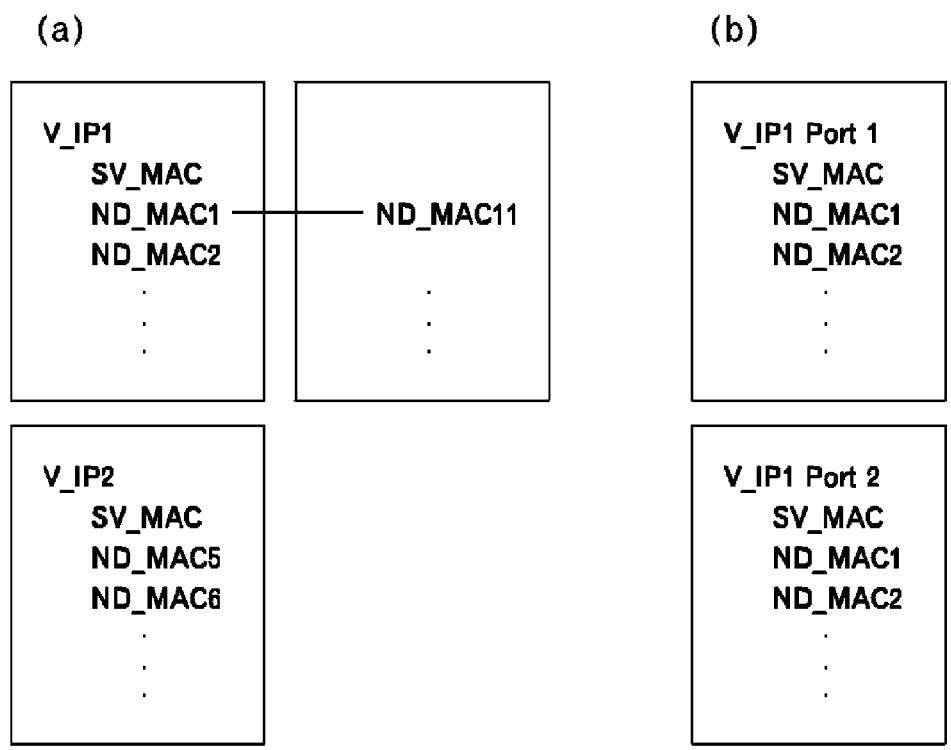
FIG. 6 shows an example of a table structure of a network data database.

FIG. 6 shows an example of a table structure 600 of the network data database. The network data table includes the following items: a source MAC address 601, a destination MAC address 602, a data hash value 603, registering time 604 and network data 605. The source MAC address 601 and the destination MAC address 602 are extracted from the Ethernet header of network data. The data hash value 603 is determined based on the network data except the Ethernet header by means of a hash function. The purpose of using the hash value is to reduce a processing time by comparing the hash values, because it takes time to compare all data in order to determine whether or not two network data are identical.

The data hash value 603 can be replaced with anything, such as the sequence number of a TCP header, which is determined uniquely. The registering time 604 is used for deleting data. After one or more seconds since registering, for example, the data management section 303 shown in FIG. 3 deletes a record, based on the data processing time of the registering time 604. The network data 605 is network data registered as it is. Information, such as the IP address, a port number or the start and end of a transaction, is extracted from the network data 605. However, if the IP address or port number is registered as a different item, it is not necessary to register the network data 605.

Figure 7:
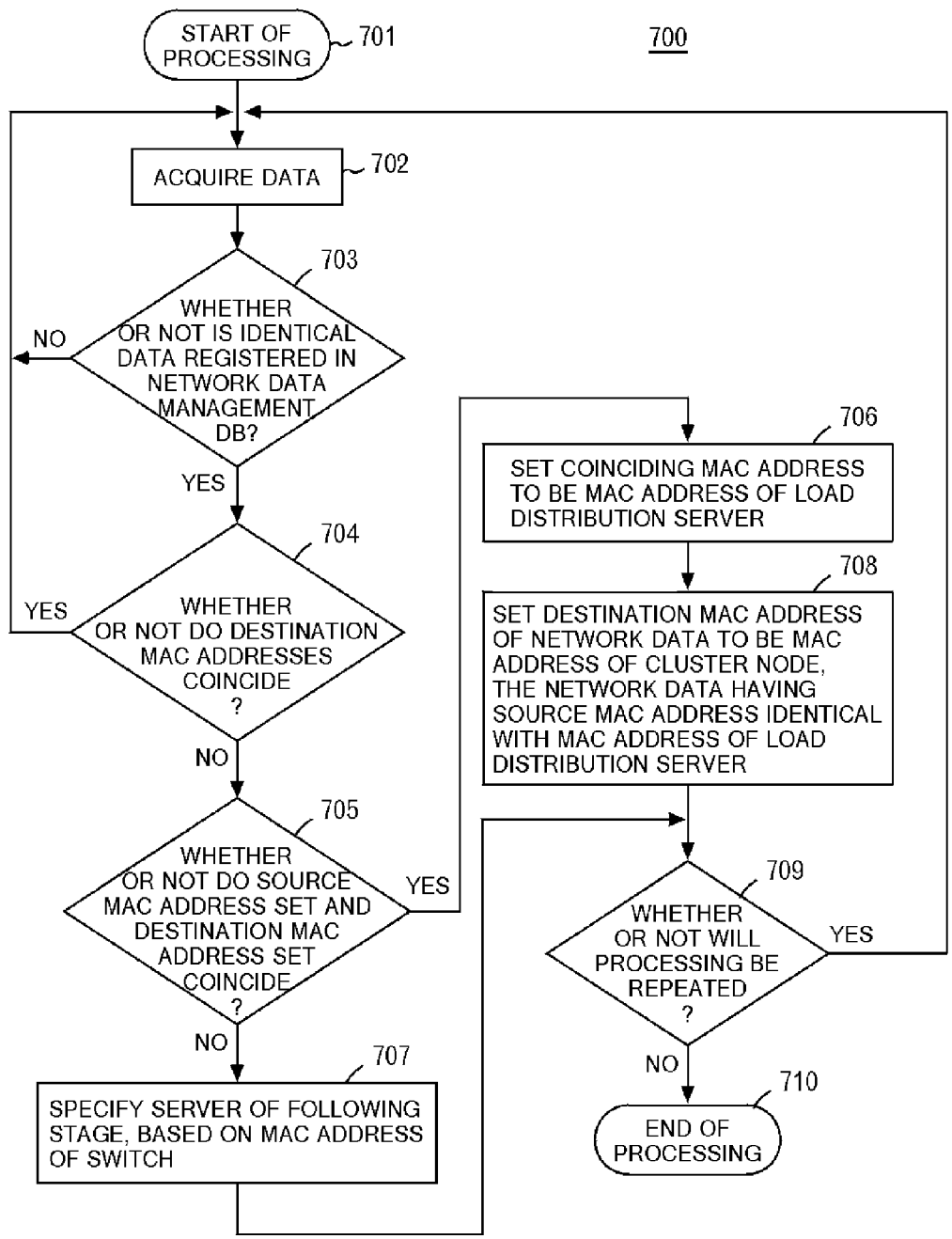
FIG. 7 is a flowchart illustrating a flow for detecting a component of a load balancing system.

FIG. 7 shows a flow 700 for detecting a component of a load balancing system based on the MAC transfer mode. Processing starts at step 701. Network data is acquired at step 702. At step 703, a determination is made as to whether network data identical with the acquired network data has been registered in a network data management database. Comparison by use of the data hash values speeds up the process of the determination. When it is determined that overlapping network data has not been registered (No) at step 703, the processing returns to step 702, where next data is then registered.

On the other hand, when it is determined that overlapping network data has been registered (Yes) at step 703, the processing goes to step 704. At step 704, a determination is made as to whether or not the destination MAN addresses of the overlapping network data coincide with each other. When it is determined that the destination MAN addresses coincide with each other, (Yes) at step 704, the processing returns to step 702, where next data is then registered. This is because the coincidence of the destination MAC addresses with each other leads to a determination that the network data is the retransferred one.

Figure 5:
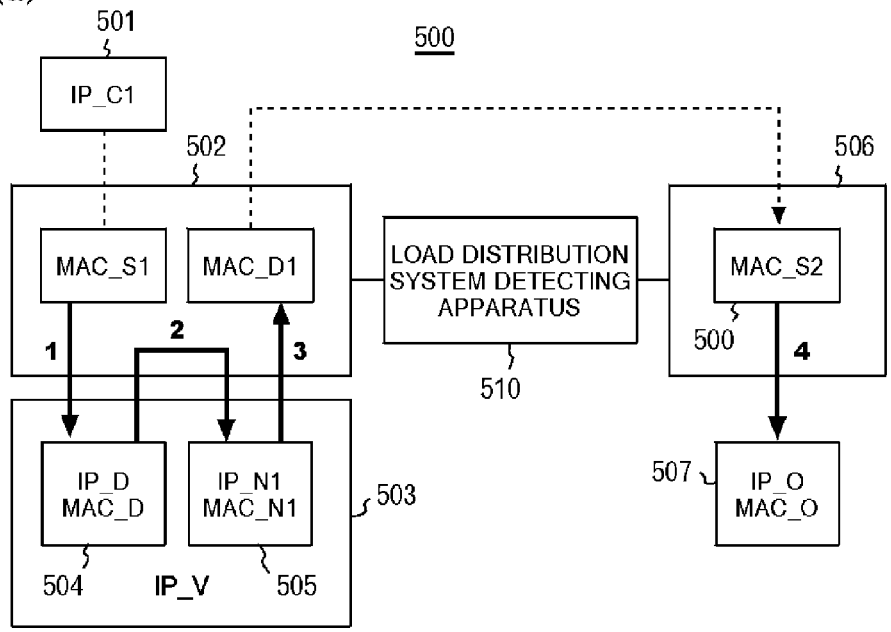
FIGS. 5A and 5B show an example of changes in MAC and IP addresses, when network data are transferred.

On the other hand, when it is determined that the destination MAC addresses do not coincide with each other (No) at step 704, the processing goes to step 705. At step 705, a determination is made as to whether or not a destination MAC address set and a source MAC address set coincide with each other. Herein, the reason for using the MAC address set is that the MAC addresses can be grasped as a set, since the load balancing server performs many MAC transfers even in a short time. Although a grasp of the MAC address set achieves higher accuracy, the MAC addresses are not necessarily limited to being grasped as the set. When it is determined that there is no coincidence (No) at step 705, the processing goes to step 707. At step 707, the server located at the following stage across the network switch, such as the server 507 shown in FIG. 5, is specified based on the MAC address of the network switch. After that, the processing goes to step 709.

When it is determined that there is a coincidence (Yes) at step 705, the processing goes to step 706. At step 706, the coinciding MAC address at step 705 is set to be the MAC address of the load balancing server. In addition, the destination MAC address of network data having, as the source MAC address, the MAC address of the load balancing server is set to be the MAC address of the cluster node. Then, the processing returns to step 702 to be repeated. At step 708, the destination MAC address of the network data having, as the source MAC address, the MAC address of the above-mentioned load balancing server is set to be the MAC address of the cluster node. At step 709, a determination is made as to whether or not the processing will be further repeated. When it is determined that the processing will be repeated (Yes) at step 709, the processing returns to step 702. When it is determined that the processing will not be repeated (No) at step 709, the processing goes to step 710, where the processing ends.

FIGS. 8A and 8B show examples of network components found by the load balancing system detecting apparatus. FIG. 8A shows that two clusters having virtual IP addresses V_IP1 and V_IP2, respectively, are specified, and that moreover, ND_MAC11 is connected to the server of the following stage via the network switch. FIG. 8B shows that clusters, although using an identical virtual IP address, are divided according to the port number.

As described above, the load balancing system detecting apparatus according to the present invention, without relying on a system administrator, causes currently active system configuration information to be detected and acquired. Accordingly, it is made possible to grasp a relationship between a cluster and cluster nodes (servers) constituting the cluster, and to perform a business impact analysis and an impact analysis upon availability of IT systems.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

That which is claimed is:

1. A method, comprising:
acquiring first network data;
determining whether second network data identical in contents with the first network data are registered in a network data database;
determining any one of whether a destination address of the first network data coincides with a source address of the second network data and whether a source address of the first network data coincides with a destination address of the second network data, in response to a destination that the identical second network data is registered; and
determining that the coinciding source and destination addresses are set to be an address of a load balancing apparatus, in response to a determination that there is a coincidence in the above-mentioned determining step.

2. The method according to claim 1, wherein
the destination address of the network data having the address of the load balancing apparatus as the source address is set to be an address of a cluster node.

3. The method according to claim 1, wherein
the destination address and the source address are a source MAC address and a destination MAC address, respectively; and
the network data is a packet to be transferred via a network switch, having a virtual IP address; and
the load balancing apparatus performs a MAC transfer of the packet.

4. The method according to claim 3, further comprising:
specifying a server of a following stage, based on the MAC addresses of the network switch, when the contents of the first network data are identical with those of the second network data and there is no coincidence between any one of the source and destination MAC addresses of the first network data, and any of those of the second network data.

5. The method according to claim 4, wherein
determining whether the identical data is registered uses the sequence number of a TCP header to make a determination.

6. The method according to claim 1, wherein
determining whether the identical data is registered uses a hash value of the contents of the network data to make a determination.

7. The method according to claim 1, further comprising deleting the network data after a certain period of time since the network data are registered.

* * * * *